United States Patent
Cazanas et al.

(10) Patent No.: US 9,142,074 B2
(45) Date of Patent: Sep. 22, 2015

(54) SYSTEM FOR AND METHOD OF PAPER NOTE AUTHENTICATION AND TRACKING THROUGH NFC

(71) Applicant: Cellco Partnership, Basking Ridge, NJ (US)

(72) Inventors: Carlos A. Cazanas, Bethlehem, PA (US); Victor Pagan, Breinigsville, PA (US); Kalpan Shah, Bridgewater, NJ (US); Phillip Anthony Leone, Frenchtown, NJ (US)

(73) Assignee: Cellco Partnership, Basking Ridge, NJ (US)

( * ) Notice: Subject to any disclaimer, the term of this patent is extended or adjusted under 35 U.S.C. 154(b) by 151 days.

(21) Appl. No.: 13/971,406

(22) Filed: Aug. 20, 2013

(65) Prior Publication Data

US 2015/0055850 A1    Feb. 26, 2015

(51) Int. Cl.
*G06K 9/00* (2006.01)
*G07D 7/00* (2006.01)
*H04B 5/00* (2006.01)

(52) U.S. Cl.
CPC .............. *G07D 7/004* (2013.01); *H04B 5/0031* (2013.01)

(58) Field of Classification Search
CPC ............................. H04B 5/0031; G07D 7/004
See application file for complete search history.

(56) References Cited

U.S. PATENT DOCUMENTS

| | | | | |
|---|---|---|---|---|
| 8,694,772 B2 * | 4/2014 | Kao et al. | | 713/156 |
| 8,931,688 B2 * | 1/2015 | Eldefrawy et al. | | 235/375 |
| 2003/0056104 A1 * | 3/2003 | Carr et al. | | 713/176 |
| 2008/0081608 A1 * | 4/2008 | Findikli et al. | | 455/425 |
| 2009/0117879 A1 * | 5/2009 | Pawar et al. | | 455/412.1 |
| 2014/0162598 A1 * | 6/2014 | Villa-Real | | 455/411 |
| 2015/0055850 A1 * | 2/2015 | Cazanas et al. | | 382/135 |

* cited by examiner

*Primary Examiner* — Gregory M Desire

(57) ABSTRACT

A system for and method of paper note authentication and tracking through NFC is presented. The system and method includes utilizing an authenticating device to receive paper note data using an NFC reader, transmit the paper note data to an authenticating party, receive an authentication determination and/or additional paper note data, and authenticate the paper note where the authentication determination indicates accordingly. The system and method may further include updating the paper note data upon authentication to prevent duplicate authentication attempts.

20 Claims, 3 Drawing Sheets

SYSTEM FOR AND METHOD OF PAPER NOTE AUTHENTICATION AND TRACKING THROUGH NFC

BACKGROUND INFORMATION

Paper note authentication is important in combating counterfeit paper notes. Paper notes may include, for example, currency, bonds, stocks, checks, notarized documents, and other certificates. Communicating authentication of a paper note may be through a variety of channels and may include a lengthy process. Moreover, authentication of a paper note may include a subjective analysis and thus, may provide varying results depending on the authenticator.

BRIEF DESCRIPTION OF THE DRAWINGS

The present invention, together with further objects and advantages, may best be understood by reference to the following description taken in conjunction with the accompanying drawings, in the several figures of which like reference numerals identify like elements, and in which.

DETAILED DESCRIPTION OF PREFERRED EMBODIMENTS

Figure 1:
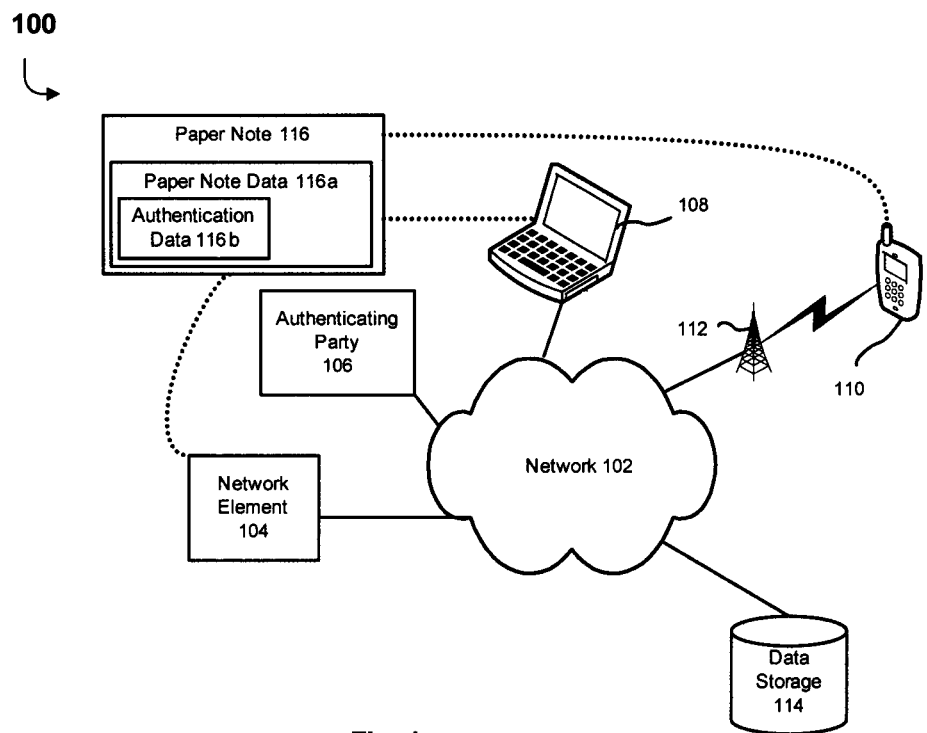
FIG. 1 is a schematic diagram illustrating a system according to a particular embodiment.

A system and method may include various exemplary embodiments for authenticating and tracking a paper note using near field communication ("NFC") technology. A paper note may include any document that may require authentication, such as, for example, currency, bonds, stocks, checks, notarized documents, certificates, and other data that is authenticated. Each paper note to be authenticated and tracked may contain a particular piece of data that can be read using an NFC reader. Each time the paper note must be authenticated, an NFC reader may read the information held on the paper note data. Paper note data may include, but is not limited to, an authentication and/or transaction history, creation date, creator, authentication data, paper note amount, paper note signature data, owner, and/or other identifying information. An authentication tag may include, for example, a pre-shared secret key. An owner may be a party who currently owns the authentic paper note.

In use, the paper note data may be read by an NFC reader in order to authenticate and track the paper note. The NFC reader may pass the paper note data to an authenticating party, such as, for example, a clearing house. The clearing house may communicate with the paper note creator to verify paper note data, including authentication data. A paper note creator may include, for example, a financial institution, a banking institution, a government institution, a private company, and/or an authenticated individual. In other embodiments, the clearing house may verify the paper note without the input of a paper note creator at the time authentication is desired.

Once the paper note creator and/or clearing house verifies that the paper note is authentic, the verification may be sent to the device housing the NFC reader. Authentication data may then be updated, replaced, or altered once the paper note housing authentication data has been verified as authentic. For example, where authentication data comprises a pre-shared key, a new pre-shared key may be sent by the authenticating party, owner, creator, and/or a third party providing authentication data, and stored in authentication data storage of the paper note. This may ensure that a paper note cannot be duplicated and subsequently authenticated twice since authentication data may only be used once. For example, where the authentication data comprises a pre-shared key, each pre-shared key may only be used once in authentication. Where a paper note may need to go through multiple authentications at different times and with a different party or parties, where each authentication data for each authentication attempt may be distinct. In other examples, a number of paper note datum and/or authentication datum may be used for the authentication and/or transaction processes. For example, along with authentication data, paper note data, such as an authentication log that contains a history of all authentications of the paper note, may be used so that the authentication log read from the paper note data may be compared to an authentication log associated with the paper note that is stored over the network. Similar to the updating of the authentication data, other paper note data may also be updated and compared to create a multi-factor authentication. The updating of authentication data and other paper note data allows a paper note to be authenticated more than once, without compromising the security of authentication data.

The decision of whether a paper note requires multi-factor authentication maybe determined based on a risk associated with the paper note. For example, the risk associated with duplicating a paper note associated with a high worth or value (such as a bond worth a lot of money or an extremely important legal document) may be higher than a paper note associated with a lower worth or value, such as a dollar bill. In general, the paper note creator (whether government or private party) may determine whether or not multi-factor authentication is to be used.

The additional layer of security of additional data associated with the paper note may be sent and stored over a network as well. The additional data associated with the paper note may be stored with a clearing house, a paper note creator, and/or a third party. For example, a digital image of the original paper note may be stored over a network. The digital image may be scanned or captured using, for example, a camera upon creation. Upon authentication of the paper note, the digital image of the original paper note may also be compared to a current image of the paper note (also obtained using a scanner or a camera) for visual inspection of authentication. For example, where a paper note is a notarized document with a digital signature, and the digital signature houses authentication data, the digital image of the original notarized document may be compared to the current image of the notarized document for a visual comparison. Furthermore, a picture of the requesting party may be captured using a camera, and upon an authentication attempt, the image of the requesting party may be sent and stored over the network. In this manner, the requestor's identity may be checked by an authenticating party, the creator, the owner, or a third party system before authentication. The system may require the owner and/or creator to verify that the requesting party is not attempting a fraudulent authentication. In another example, the digital image of the requesting party may be compared to a digital image associated with an identification card of the requesting party, which may be stored over the network. Additionally, the image of the requesting party may be used after authentication when a duplicate authentication request is made and/or challenged. In this manner, the owner, creator, authenticating party, and/or a third party may be provided with dispute resolution regarding the varying authentication attempts.

In response to the request, additional paper note data, such as, for example, authentication attempt date and time, creator data, and/or last authentication date and time may be sent to the paper note owner and/or the creator for verification purposes as well. A paper note owner may be a party who is a registered owner of the paper note. In this manner, where a paper note has been duplicated and a party is listed as the owner and/or creator of the paper note, the owner and/or creator may be notified of an authentication attempt in order to verify that the owner is the requesting party who is attempting to authenticate the paper note or that the authentication attempt is otherwise approved by the owner/creator. This notification may be in the form of an email, text message, phone call, SMS, MMS, push notification, or the like to a device registered as associated with the owner and/or creator. This information may be stored in data storage over the network. Should the response to the notification approve or affirm authentication, the authentication process may continue and either continue to other authentication steps or transmit an approved authentication to the network device attempting to authenticate the paper note. Should the response to the notification be a denial of authentication, the device registered to the owner and/or creator may generate a stop authentication command to the network device attempting to authenticate the document and the paper note may be deemed inauthentic.

FIG. 1 is a schematic diagram illustrating a system 100 according to a particular embodiment. The system 100 may include a network element 104, a clearing house 106, a computer 108, a mobile device 110, and data storage 114 all connected over a network 110. A network element 104, computer 108, and mobile device 110 may all be equipped with NFC transceivers that may read paper note data 116a, which may include authentication data 116b, of the paper note 116. The paper note data 116a, which may include the authentication data 116b may be read by an NFC reader or other data reader. Accordingly, paper note data 116a and authentication data 116b may reside on various tags including NDEF, RFID, and ISO 14443. Additionally, the paper note data 116a and authentication data 116b may reside on tags such as PicoPass, any Mifare product, Topaz, Jewel, My-d move, My-d NFC, FeliCa, Kovio, Smart MX, SLE 66 CL, Micropass, Vault IC, Type 4+, 16RF, B Prime, and the like. In a preferred embodiment, the paper note data 116a and authentication data 116b may be embedded within the paper note 116 at the time of manufacture in the form of an NFC wafer. In another embodiment the paper note data 116a and the authentication data 116b may be added to the paper note 116 at the time of authentication in the form of an NFC wafer. Moreover, the system may contain a communication link 112, which a mobile device 110 may utilize to connect to the network 110.

As used herein, the term "network" may be a wireless network, a wired network or any combination of wireless network and wired network. For example, a network may include one or more of a fiber optics network, a passive optical network, a cable network, an Internet network, a satellite network (e.g., operating in Band C, Band Ku or Band Ka), a wireless LAN, a Global System for Mobile Communication ("GSM"), a Personal Communication Service ("PCS"), a Personal Area Network ("PAN"), D-AMPS, Wi-Fi, Fixed Wireless Data, IEEE 802.11a, 802.11b, 802.15.1, 802.11n and 802.11g or any other wired or wireless network for transmitting and/or receiving a data signal. In addition, a network may include, without limitation, telephone line, fiber optics, IEEE Ethernet 802.3, a wide area network ("WAN"), a local area network ("LAN"), or a global network such as the Internet. Also, a network may support, an Internet network, a wireless communication network, a cellular network, or the like, or any combination thereof. A network may further include one, or any number of the exemplary types of networks mentioned above operating as a stand-alone network or in cooperation with each other. A network may utilize one or more protocols of one or more network elements to which it is communicatively coupled. A network may translate to or from other protocols to one or more protocols of network devices.

A paper note 116, in addition to information printed on the surface of the note or otherwise accessible such as watermarking, may store paper note data which may be read using an NFC reader of a network element 104, computer 108, and/or mobile device 110. Upon reading paper note data, a network element 104, computer 108, and/or mobile device 110 may transmit the paper note data to an authenticating party 106, which may be a clearing house and begin the authentication process detailed in FIG. 3.

Figure 2:
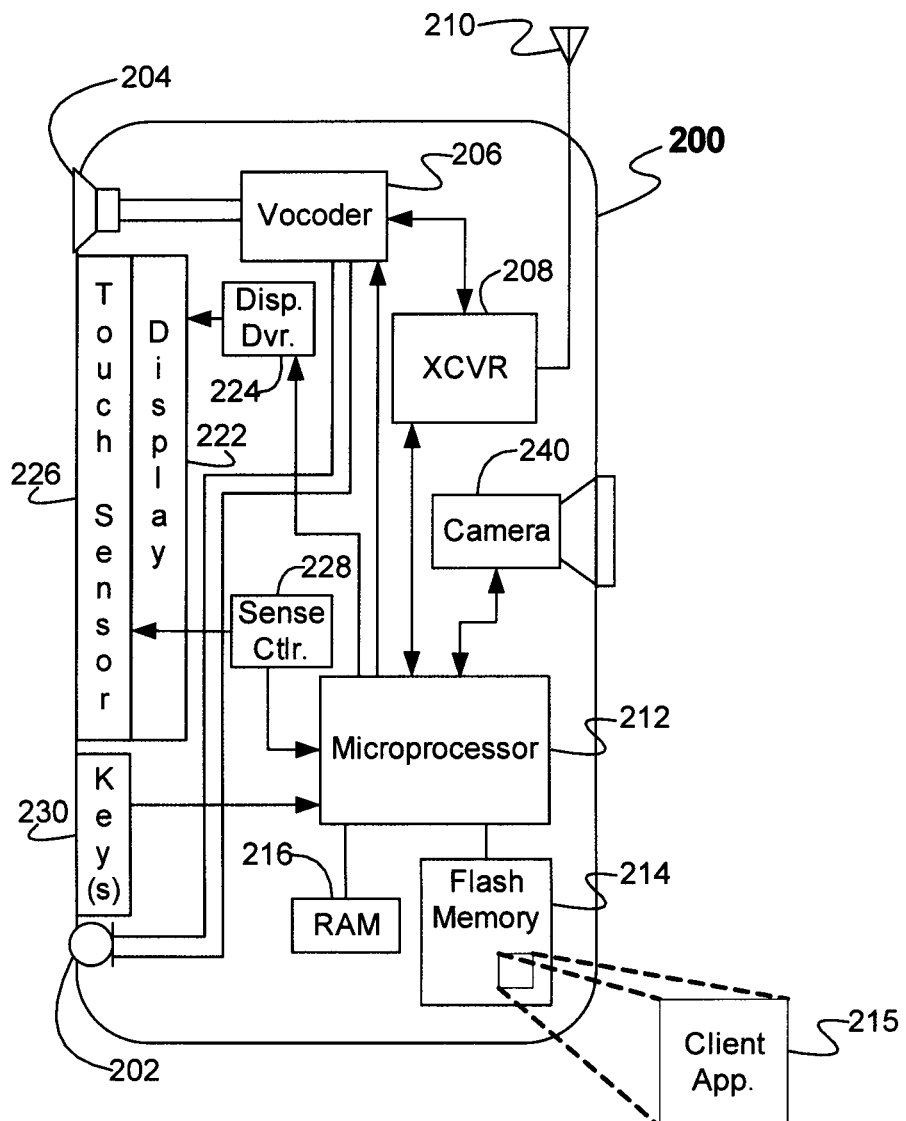
FIG. 2 is a block diagram of a hardware component of the system of a particular embodiment.

FIG. 2 illustrates a block diagram of a hardware component of the system of an exemplary embodiment. While FIG. 2 illustrates a block diagram of a mobile device 110, such as a mobile phone, similar components may be included in any mobile device 110, network element 104, and computer 108. As illustrated in FIG. 2, a mobile device 200 may include a microphone 202, a speaker 204, and a voice encoder ("vocoder") 206, for audio input and output functions. A mobile device 200 may also include a display 222, connected to a touch sensor 226 to enable a "touch screen" on the mobile device 200, key(s) 230 to enable alphanumeric input, a camera 240, a sensory control 228, and a display driver 224 to facilitate user input/output. A camera 240 may be used in order to receive visual input, such as, for example, a picture of the party requesting paper note authentication. Moreover, a mobile device 200 may include a microprocessor 212 and various types of memory, such as RAM 216 and flash memory 214, which may store a client application 215. A client application 215 may include instructions that when executed may perform paper note authentication as illustrated in FIG. 3.

A mobile device 200 may also include at least one transceiver (XCVR) 208 for wireless communication, which may include a digital transceiver, an NFC transceiver, and/or an analog transceiver. Each transceiver 208 may connect to an external input/output device, such as an antenna and/or NFC reader 210. An NFC reader 210 may include short range, high frequency technology that enables short range exchange of data with a paper note 116. When a paper note 116 is place in proximity to a network element 104, computer 108, or mobile device 110, an NFC reader 210 may read paper note data from a corresponding NFC-enabled paper note data 116a, including authentication data 116b. Thus, the network element 104, computer 108, or mobile device 110 may be used to identify and assist in authentication of a paper note 116.

Figure 3:
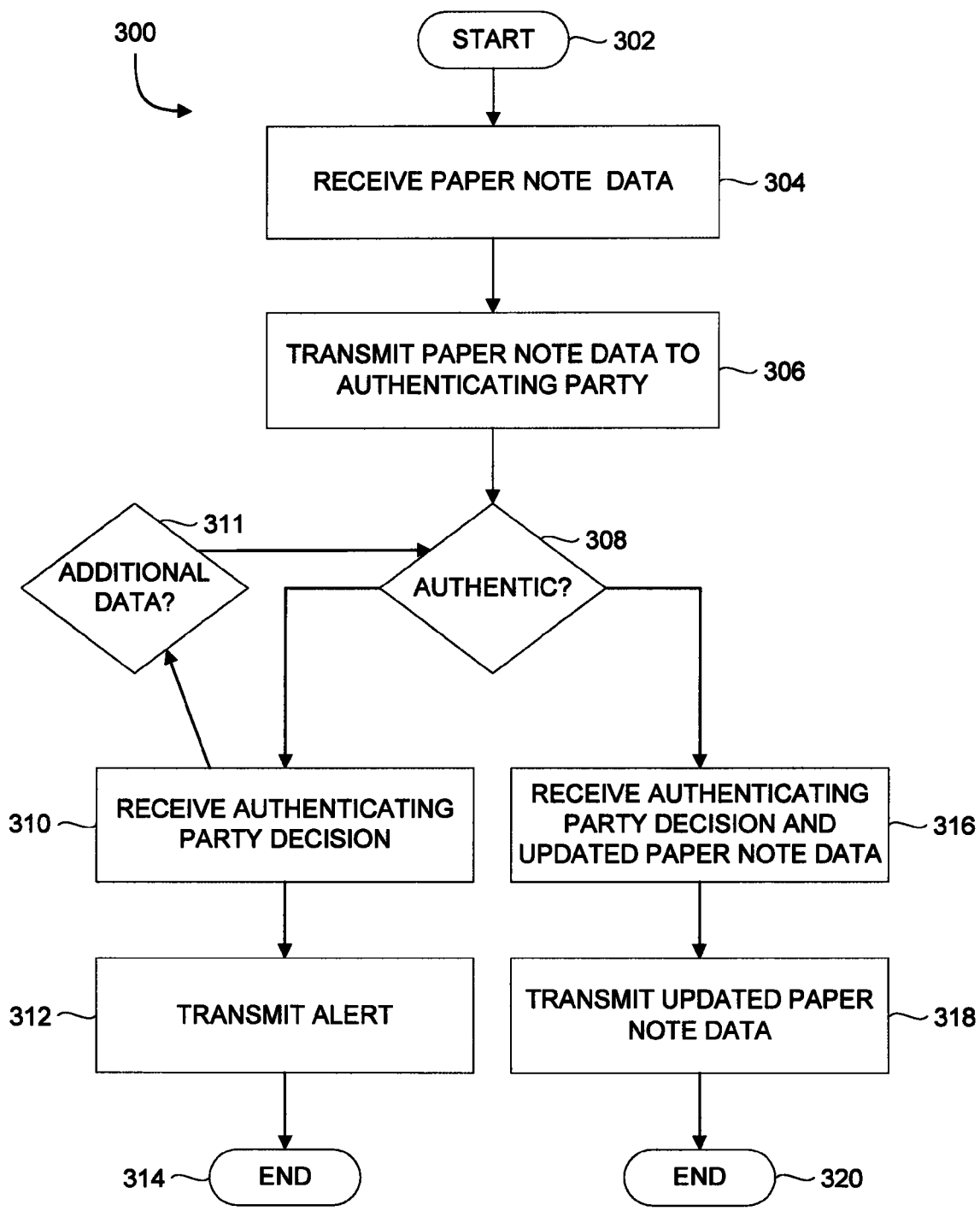
FIG. 3 is a flowchart illustrating the functionality of a particular embodiment.

FIG. 3 illustrates a flowchart illustrating the functionality of a particular embodiment. The method 300 of FIG. 3 begins at step 302. At step 304, a device used in authenticating the paper note may receive paper note data from the paper note via an NFC reader 210. Paper note data 116a may be passively stored data and include, but is not limited to, an authentication and/or transaction history, creation date, creator, authentication data 116b, paper note amount, paper note signature data, owner, and/or other identifying information. Authentication data 116b may include, for example, a pre-shared secret key. An owner may be a party who currently owns the authentic paper note. An authenticating device may be, for example, a network element 104, a computer 108, and/or a mobile device 110. The authenticating device may also capture an image of the party requesting authentication using a camera to combine with the paper note data.

At step 306, the device used in authenticating the paper note may transmit the paper note data 116a, including authentication data 116b to an authenticating party 106. The authenticating party 106 may be a clearing house, a paper note creator, or another third party. As an example, where the authenticating party 106 is a clearing house, the clearing house may communicate with the paper note creator to verify paper note data 116a, including authentication data 116b. A paper note creator may include, for example, a financial institution, a banking institution, a government institution, a private company, and/or an authenticated individual. The clearing house may also verify the paper note without the input of a paper note creator. Moreover, when a captured image of the party requesting authentication is combined with the paper note data in step 304, the image of the requesting party may also be transmitted in step 306 to the authenticating party, creator, and or a third party for verification purposes.

At step 308, the authenticating party determines whether the paper note is authentic. An authentic paper note may include a paper note that maintains up to date paper note data 116a and/or authentication data 116b that is valid and unused. Additionally, an authentic paper note may be determined by comparing various paper note datum, including the authentication data 116b. In this manner, a multi-factor authentication may take place allowing multiple data fields to be compared to corresponding data fields stored over the network 110.

In one example, where a paper note 116 is a check, authentication data 116b of the check may include a first pre-shared secret key. Once a check is authenticated, a new secret key may be sent to the check from the authenticating party to be stored as a second pre-shared secret key on the paper note 116 using NFC. As an example, where authentication includes only authentication of a pre-shared key, an attempt to authenticate a duplicate check containing a duplicate first pre-shared secret key presented to an authenticating party may result in a denied authentication since the first pre-shared secret key does not match the second, or updated pre-shared key that is the current authentication data 116b associated with the check. In another example, the paper note 116 may be associated with a high value or worth, and the paper note data 116a may include an authentication log and unique authentication data 116b. In this instance, both the authentication log stored on the paper note 116 and the unique authentication data 116b may be compared to an authentication log stored over the network 110 and a unique authentication data stored over the network 110. Once authenticated, both the authentication log and the unique authentication data stored on the paper note and over the network may be updated. The updated data stored over the network 110 and on the paper note 116 prevent a duplicate authentication of a potentially counterfeit paper note 116 since the potentially counterfeit paper note 116 will not have the updated paper note data 116a stored on the paper note 116. The associations between paper note 116 and paper note data 116a may be stored in data storage associated with the authenticating party (not shown) and thus in one embodiment inaccessible to entities other than the authenticating party. Alternatively, this data may be stored in data storage 114 accessible over the network 110.

Once the authenticating party makes an authentication determination, the authenticating party may transmit that determination through the network 110 to the authenticating device, such as a mobile device 200. In step 310, the authenticating device subsequently receives the determination, which may indicate that the paper note is not authentic and/or more information is required in order to authenticate.

Where an authentication determination is that more information is needed, the authenticating party may transmit details of the additional information needed along with the authentication determination. In other embodiments, the details of the additional information needed may be sent separately from the authentication determination in an additional communication. Furthermore these authentication details may be sent to any device accessible by and associated with the requesting party, owner, and/or creator. For example, where a visual inspection of the paper note is needed to accompany the authentication determination, and the received paper note data does not include a current digital image of the paper note 116 (due to lack of scanning and/or camera capabilities for example), the authenticating party may transmit a digital image of the original paper note as stored in data storage 114. A visual inspection of the paper note may then be performed by comparing the digital image of the paper note received from the authenticating party 106 with the paper note presented for authentication. As another example, additional information needed for authentication may include verification from a paper note owner and/or creator. In this instance, the details of the additional information may be transmitted to a paper note owner and/or creator (which may or may not be the party requesting authentication), and in response the paper note owner and/or creator may need to provide a verification that the authentication attempt is valid. For example, the paper note owner may receive an alert on a mobile device with authentication attempt details and the paper note owner may then verify the attempt by responding to the alert. Additionally, if the paper note is owned by a company and/or a government entity, the company and/or government entity may also receive an alert with authentication attempt details.

In step 311, where the authentication determination requests additional information in order to make a final authentication determination, the additional information and/or data may be sent to the authenticating party through the network 110 from a creator, clearing house, data storage 114 or other third party system. For example, for verification using visual inspection of the paper note or verification of the paper note owner and/or creator, the original and current images stored over the network and/or captured using a camera or scanner may be transmitted to the authenticating party. The authenticating party, having received the additional information through the network 110, may then process the additional information to come to a final authentication determination at step 308.

In step 312, when the authenticating party receives a decision that the authentication attempt is invalid, the authenticating device may then transmit an alert to the paper note owner, the paper note creator, and/or a third party alerting system. The alert may include data representative of the failed authentication attempt including a date and timestamp of the authentication attempt, a location of authentication attempt, the identity of the individual associated with the failed authentication attempt, including visual data, and any relevant paper note data or authenticating party data such as authenticating party location. The alert data may also be used to correlate forgery or counterfeit paper note usage throughout a predetermined location, such as the United States, or a predetermined day, date, or time range. The predetermined location or day, date, or time range may be designated by the paper note owner, paper note creator, and/or a third party alerting system. The method may then end at step 314.

Where the authentication determination indicates that the paper note is authentic, the authenticating party may transmit that determination to the authenticating device, such as a mobile device 200. In step 316, the authenticating device may receive the authenticating party determination along with new paper note data 116a, which may include new authentication data 116b. In step 318, new or updated paper note data 116a including new or updated authentication data 116b may be transmitted from the authenticating party to the paper note 116 using NFC technology in order to store new or updated paper note data 116a on the paper note. The authenticating party may also store the new or updated paper note data 116a in a secure data storage (not shown). Alternatively, where the new or updated paper note data 116a is stored in a data storage 114 over the network 110, the authenticating party may not permanently store the new or updated paper note data 116a that it transmits. In this manner, the new or updated paper note data 116a may not be compromised via the authenticating party. Paper note data 116a may include an authentication log, such as authentication attempt details including a date and timestamp of the authentication, a location of authentication, the identity of the individual associated with the authentication, and any other relevant authentication and/or transaction data. The method may then end at step 320.

It is to be appreciated that the set of instructions, e.g., the software, which configures the computer operating system to perform the operations described above may be contained on any of a wide variety of media or medium, as desired. Further, any data that is processed by the set of instructions might also be contained on any of a wide variety of media or medium. That is, the particular medium, i.e., the memory in the processing machine, utilized to hold the set of instructions and/or the data used in the invention may take on any of a variety of physical forms or transmissions, for example. Illustratively, the medium may be in the form of paper, paper transparencies, a compact disk, a DVD, an integrated circuit, a hard disk, a floppy disk, an optical disk, a magnetic tape, a RAM, a ROM, a PROM, a EPROM, a wire, a cable, a fiber, communications channel, a satellite transmissions or other remote transmission, as well as any other medium or source of data that may be read by a computer.

In the preceding specification, various preferred embodiments have been described with references to the accompanying drawings. It will, however, be evident that various modifications and changes may be made thereto, and additional embodiments may be implemented, without departing from the broader scope of invention as set forth in the claims that follow. The specification and drawings are accordingly to be regarded in an illustrative rather than restrictive sense.

We claim:

1. A system, comprising:
a network;
an authenticating device comprising an NFC reader and one or more visual input devices, wherein the authenticating device is configured to perform the steps comprising:
receiving, via the NFC reader, paper note data associated with a paper note from the paper note, wherein the paper note data includes a one-time-use authentication data;
capturing, via the one or more visual input devices, a digital image of the paper note;
transmitting, via the network, the paper note data and the digital image of the paper note to an authenticating party for authentication by the authenticating party;
receiving, via the network, an authentication determination based on the paper note data and the digital image of the paper note from the authenticating party; and
transmitting an authentication determination response based on the authentication determination.

2. The system of claim 1, wherein a paper note may include at least one of: currency, bonds, stocks, checks, notarized documents, or certificates.

3. The system of claim 1, wherein the one or more visual input devices includes at least one of: a camera or a scanner.

4. The system of claim 1, wherein the authentication determination includes a determination that at least one additional data is required, and wherein the authentication determination response includes a description of the at least one additional data.

5. The system of claim 4, wherein the description of the at least one additional data includes at least one of: a digital image of an original copy of the paper note stored over the network, a verification signal from a paper note owner or paper note creator, or an image of a party attempting to authenticate the paper note.

6. The system of claim 1, wherein the authentication determination includes a determination that the paper note is not authentic, and wherein the authentication determination response includes an alert to at least one of: a paper note owner, a paper note creator, or a third party alerting system.

7. The system of claim 6, wherein the alert includes at least one authentication attempt data comprising at least one of: the authentication attempt date and time, the authentication attempt location, or identification information of the party attempting to authenticate the paper note.

8. The system of claim 1, wherein the authentication determination includes a determination that the paper note is authentic and an updated one-time-use authentication data, and wherein the authentication determination response includes at least one updated paper note data.

9. The system of claim 1, wherein the authentication data includes a pre-shared secret key.

10. The system of claim 1, wherein the authenticating device is further configured to transmit to at least one data storage via the network, updated paper note data, wherein the updated paper note data comprises at least one of: an authentication attempt date and timestamp, an authentication location, a party identification of the party attempting to authenticate the paper note, or the authentication determination.

11. A method comprising:
receiving, via an NFC reader of an authenticating device, at least one paper note data associated with a paper note, wherein the paper note data includes a one-time-use authentication data;
capturing, via one or more visual input devices of the authenticating device, a digital image of the paper note;
transmitting from the authenticating device, via a network, the paper note data and the digital image of the paper note to an authenticating party;
receiving at the authenticating device, via the network, an authentication determination from the authenticating party, wherein the authentication determination is based on the paper note data and the digital image of the paper note; and
transmitting from the authenticating device an authentication determination response based on the authentication determination.

12. The method of claim 11, wherein a paper note may include at least one of: currency, bonds, stocks, checks, notarized documents, or certificates.

13. The method of claim 11, wherein the one or more visual input devices includes at least one of: a camera or a scanner.

14. The method of claim 11, wherein the authentication determination includes a determination that at least one additional data is required, and wherein the authentication determination response includes a description of the at least one additional data.

15. The method of claim 14, wherein the description of the at least one additional data includes at least one of: a digital image of an original copy of the paper note stored over the network, a verification signal from a paper note owner or paper note creator, or an image of a party attempting to authenticate the paper note.

16. The method of claim 11, wherein the authentication determination includes a determination that the paper note is not authentic, and wherein the authentication determination response includes an alert to at least one of: a paper note owner, a paper note creator, or a third party alerting system.

17. The method of claim 16, wherein the alert includes at least one authentication attempt data comprising at least one of: the authentication attempt date and time, the authentication attempt location, or identification information of the party attempting to authenticate the paper note.

18. The method of claim 11, wherein the authentication determination includes a determination that the paper note is authentic and an updated one-time-use authentication data, and wherein the authentication determination response includes at least one updated paper note data.

19. The method of claim 11, wherein the authentication data includes a pre-shared secret key.

20. The method of claim 11, further comprising transmitting to at least one data storage via the network, updated paper note data, wherein the updated paper note data comprises at least one of: an authentication attempt date and timestamp, an authentication location, a party identification of the party attempting to authenticate the paper note, and the authentication determination.

* * * * *